United States Patent [19]

Huber

[11] Patent Number: 5,271,024
[45] Date of Patent: Dec. 14, 1993

[54] OPTICAL FIBER AMPLIFIER AND LASER WITH FLATTENED GAIN SLOPE

[75] Inventor: David R. Huber, Warrington, Pa.

[73] Assignee: General Instrument Corporation, Hatboro, Pa.

[21] Appl. No.: 919,921

[22] Filed: Jul. 27, 1992

[51] Int. Cl.$^5$ .............................. H01S 3/07; G02B 6/34
[52] U.S. Cl. ........................................... 372/6; 372/102; 385/37; 359/130; 359/341
[58] Field of Search ................. 372/6, 18, 19, 98, 102; 385/31, 37; 359/341, 342, 124, 127, 130

[56] References Cited

U.S. PATENT DOCUMENTS

| | | | |
|---|---|---|---|
| 4,786,132 | 11/1988 | Gordon | 385/37 |
| 4,911,516 | 3/1990 | Palfrey et al. | 385/37 |
| 5,115,338 | 5/1992 | DiGiovanni et al. | 359/337 |
| 5,134,620 | 7/1992 | Huber | 372/6 |
| 5,151,908 | 9/1992 | Huber | 372/6 |
| 5,159,601 | 10/1992 | Huber | 372/102 |
| 5,166,940 | 11/1992 | Tumminelli et al. | 385/37 |

OTHER PUBLICATIONS

R. Kashyap, et al., "All-Fibre Narrowband Reflection Gratings at 1500 nm," Electronics Letters, vol. 26, No. 11, May 24, 1990.
M. Tachibana, et al., "Gain-Shaped Erbium-Doped Fibre Amplifier (EDFA) with Broad Spectral Bandwidth," Optical Amplifiers and Their Applications, 1990 Technical Digest Series, vol. 13, Conference Edition, Optical Society of America, Aug. 6-8, 1990, Paper MD1, pp. 44-47.
M. Tachibana, et al., "Spectral Gain Cross Saturation and Hole-Burning in Wideband Erbium-Doped Fibre Amplifiers," Optical Amplifiers and Their Applications, 1991 Technical Digest Series, vol. 13, Conference Edition, Optical Society of America, Jul. 24-26, 1991, Paper ThB1-1, pp. 104-107.
Meltz, et al., "Formation of Bragg Gratings in Optical Fibers by a Transverse Holographic Method," Optics Letters, vol. 14, No. 15, Aug. 1, 1989, pp. 823-825.

Primary Examiner—Frank Gonzalez
Attorney, Agent, or Firm—Barry R. Lipsitz

[57] ABSTRACT

An in-fiber Bragg grating is used to flatten the gain slope of a fiber optical amplifier or optical fiber laser. The grating can be formed using photorefractive techniques, and is placed within a guided wave portion of a doped optical fiber. The grating is oriented at a nonperpendicular angle with respect to a longitudinal axis of the fiber, and has an interaction wavelength that is selected to flatten the gain slope of the device by diverting excess spontaneous emission therefrom. The interaction wavelength is preferably selected to correspond to a wavelength at or near that at which the spontaneous emission produced by the fiber peaks.

13 Claims, 2 Drawing Sheets

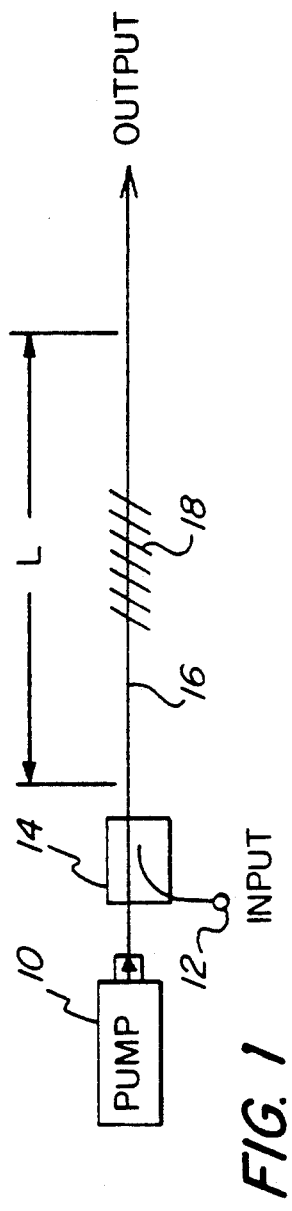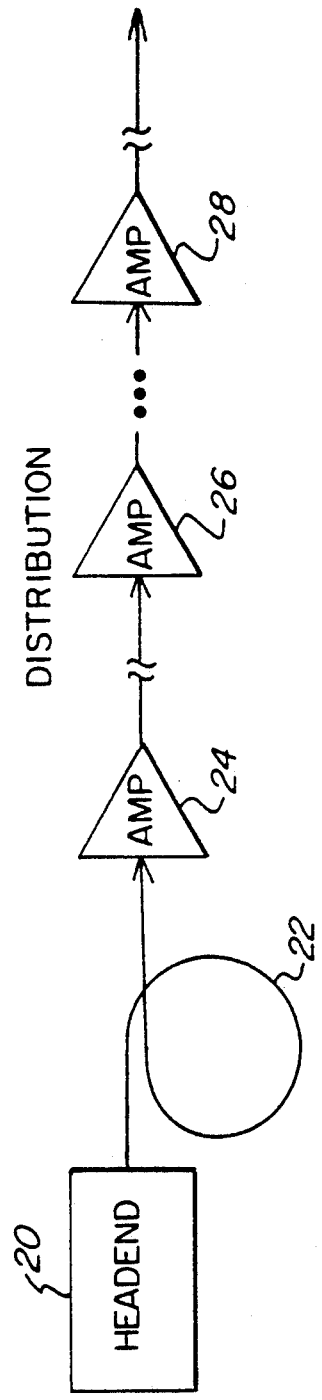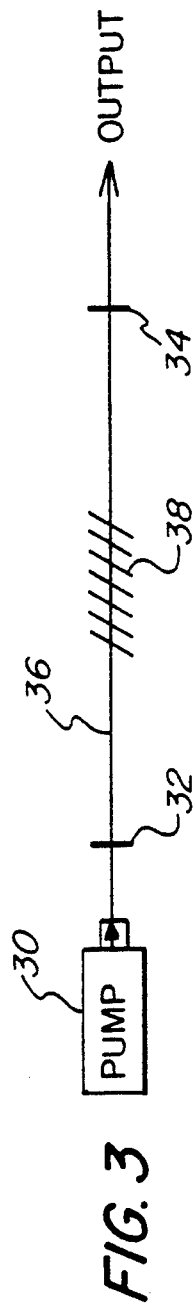

OPTICAL FIBER AMPLIFIER AND LASER WITH FLATTENED GAIN SLOPE

BACKGROUND OF THE INVENTION

The present invention relates to optical communication systems, and more particularly to optical fiber lasers and amplifiers having a flattened gain slope for use in communicating optical signals.

Cable television systems currently distribute television program signals via coaxial cable, typically arranged in tree and branch networks. Coaxial cable distribution systems require a large number of high bandwidth electrical amplifiers. For example, 40 or so amplifiers may be required between the cable system headend and an individual subscriber's home.

The replacement of coaxial cable with optical fiber transmission lines in television distribution systems has become a high priority. Production single mode fiber can support virtually unlimited bandwidth and has low attenuation. Accordingly, a fiber optic distribution system or a fiber-coax cable hybrid would provide substantially increased performance at a competitive cost as compared to prior art coaxial cable systems. Lasers, such as rare earth-doped optical fiber lasers, are used to generate an optical carrier for communicating information signals over the fiber. Optical amplifiers, such as rare earth-doped fiber amplifiers, are used to amplify the signals along the communication path.

Optical fiber amplifiers, and particularly erbium-doped fiber amplifiers, have been proposed for applications in long distance transmission and subscriber loop distribution systems. See, e.g., W. I. Way, et al, "Noise Figure of a Gain-Saturated Erbium-Doped Fiber Amplifier Pumped at 980 nm," *Optical Amplifiers and Their Applications,* 1990 Technical Digest Series, Vol. 13, Conference Edition, Optical Society of America, Aug. 6–8, 1990, Paper TuB3, pp. 134–137, and C. R. Giles, "Propagation of Signal and Noise in Concatenated Erbium-Doped Fiber Optical Amplifiers," *Journal of Lightwave Technology,* Vol. 9, No. 2, February 1991, pp. 147–154.

A disadvantage of an erbium-doped fiber amplifier is that its gain spectrum is irregular, with a sharp peak at about 1,532 nm and a broad band with reduced gain at longer wavelengths. In order to overcome this disadvantage, it has been suggested to operate such amplifiers at wavelengths away from the peak gain. However, such operation has a disadvantage in that increased spontaneous-spontaneous beat noise and possible laser action at the peak gain wavelength can occur.

Others have proposed the use of an optical notch filter in an erbium-doped fiber amplifier to shape the gain thereof and effectively suppress the gain spectrum at the peak wavelength. M. Tachibana, et al, "Gain-Shaped Erbium-Doped Fibre Amplifier (EDFA) With Broad Spectral Bandwidth," *Optical Amplifiers and Their Applications,* 1990 Technical Digest Series, Vol. 13, Conference Edition, Optical Society of America, Aug. 6–8, 1990, Paper MD1, pp. 44–47, and Tachibana, et al, "Spectral Gain Cross Saturation and Hole-Burning in Wideband Erbium-Doped Fibre Amplifiers," *Optical Amplifiers and Their Applications,* 1991 Technical Digest Series, Vol. 13, Conference Edition, Optical Society of America, Jul. 24–26, 1991, Paper ThB1-1, pp. 104–107. These articles discuss an experimental optical amplifier in which a short length of amplifier fiber was sandwiched between a mechanical grating and a flat plate to induce a resonant coupling at a particular wavelength and thereby shape the spectral gain of the amplifier.

Recent progress has been made in placing gratings in optical fibers by modifying the fiber index of refraction. Examples of processes for forming such gratings can be found in G. Meltz, et al, *Optical Letters,* Vol. 14, p. 823, 1989 and R. Kashgap, et al, *Electronics Letters,* Vol. 26, p. 730, 1990. These articles describe the formation of gratings by photorefractive techniques. The gratings disclosed in the articles are perpendicular to the direction in which the optical signal propagates through the substrate containing the grating. When the grating is placed perpendicular to the direction of the lightwave propagation, the light is reflected back upon its original path. Thus, such gratings are used as reflectors.

It would be advantageous to provide a practical method and apparatus for flattening the gain in optical fiber amplifiers and lasers. Such a method and apparatus should be straightforward to implement and provide reliable operation. It would be particularly advantageous to provide an optical fiber amplifier that can handle a plurality of communication signals that are wave division multiplexed onto an optical communication path, wherein the communication path includes a plurality of such amplifiers in a cascaded fashion.

The present invention provides a method and apparatus having the aforementioned advantages.

SUMMARY OF THE INVENTION

In accordance with the present invention, a fiber optical amplifier is provided having a flattened gain slope. A length of doped optical fiber is used to amplify an optical signal therein when pumped with a source of pump energy. The fiber produces spontaneous emission when pumped. The spontaneous emission is not uniform within the bandwidth of the amplifier. This results in an uneven gain slope. To overcome this, a Bragg grating is provided within a guided wave portion of the doped optical fiber. The grating is oriented at a nonperpendicular angle with respect to a longitudinal axis of the fiber and has an interaction wavelength selected to flatten the gain slope of the amplifier by diverting excess spontaneous emission therefrom. The interaction wavelength is selected to correspond to a wavelength at or near the wavelength at which the spontaneous emission peaks. The grating can be formed as a photoinduced Bragg grating within the guided wave portion of the doped optical fiber.

The nonperpendicular angle at which the grating is oriented can comprise an angle $\theta$, where $\theta = \sqrt{2\Delta}$. $\Delta$ is the difference in index of refraction between a core and cladding of the fiber. In an exemplary embodiment, the optical amplifier is an erbium-doped fiber amplifier and the interaction wavelength is selected to be about 1532 nm.

An optical fiber communication system is provided in which a plurality of optical amplifiers is cascaded in series along an optical transmission path. The optical amplifiers each comprise a length of doped optical fiber for amplifying an optical signal therein when pumped with a source of pump energy. A Bragg grating is provided within a guided wave portion of the doped optical fiber. The grating is oriented at a nonperpendicular angle with respect to a longitudinal axis of the fiber. The grating has an interaction wavelength selected to flatten the gain slope of the amplifier by diverting excess spontaneous emission from the fiber. In an illustrative embodiment, the optical amplifiers are erbium fiber amplifiers and the interaction wavelength of the gratings is about 1532 nm.

An optical fiber laser having a flattened gain slope is also provided in accordance with the present invention. A length of rare earth-doped optical fiber provides gain and produces spontaneous emission when pumped with a source of pump energy. A laser cavity incorporates the doped optical fiber. A Bragg grating is formed within a guided wave portion of the doped optical fiber and oriented at a nonperpendicular angle with respect to a longitudinal axis of the fiber. The Bragg grating has an interaction wavelength selected to flatten the gain slope of the laser by diverting excess spontaneous emission therefrom.

A method in accordance with the present invention flattens the gain slope of an optical fiber amplifier. A length of doped optical fiber is provided for amplifying an optical signal therein when pumped with a source of pump energy. The fiber produces spontaneous emission when pumped. Excess spontaneous emission is diverted from the fiber using a Bragg grating situated within a guided wave portion thereof. The grating has an interaction wavelength that is selected to correspond to a wavelength at or near the wavelength at which the spontaneous emission produced by the fiber peaks. The grating is oriented at a nonperpendicular angle with respect to a longitudinal axis of the fiber to provide an exit path from the fiber for the excess spontaneous emission.

BRIEF DESCRIPTION OF THE DRAWINGS

FIG. 1 is a schematic representation of a rare earth-doped optical fiber amplifier in accordance with the present invention;

FIG. 2 is a block diagram illustrating an optical fiber communication system in accordance with the present invention;

FIG. 3 is a schematic representation of an optical fiber laser in accordance with the present invention.

DETAILED DESCRIPTION OF THE INVENTION

Figure 4:
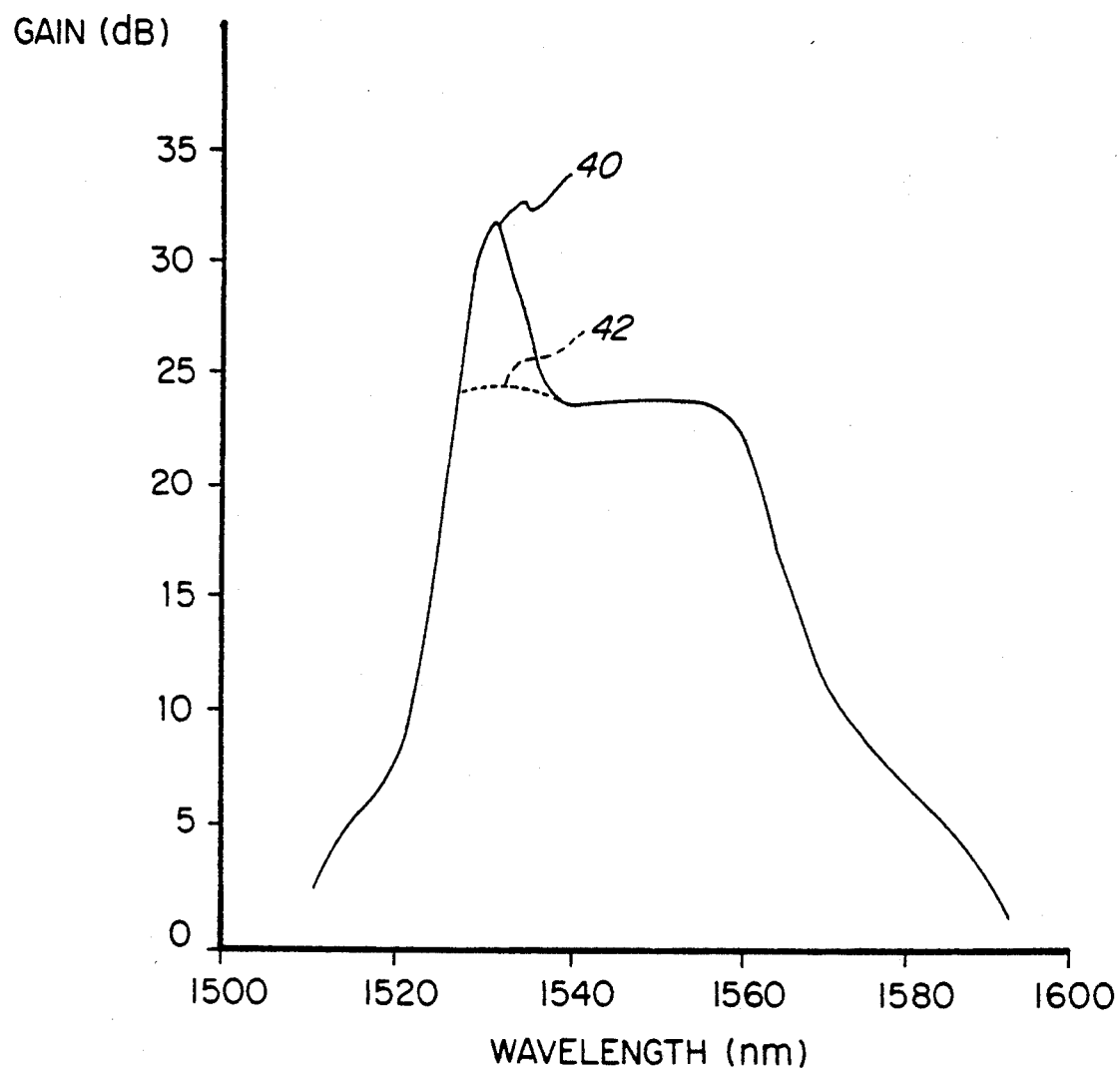
FIG. 4 is an illustration of the gain spectrum of an erbium-doped fiber amplifier before and after it is flattened according to the present invention.

The present invention uses spectral filtering to accomplish gain shaping in an optical fiber amplifier or fiber laser. In particular, an in-fiber grating is used to divert spontaneous emission from the amplifier or laser at a gain peak, thereby flattening the overall gain of the device.

FIG. 1 illustrates an optical fiber amplifier in accordance with the present invention. A pump laser 10 pumps a rare earth-doped length L of an optical fiber 16 to provide amplification in a conventional manner. The signal to be amplified is coupled from a terminal 12 to the fiber 16 via a conventional optical coupler 14.

In accordance with the present invention, a Bragg grating 18 is provided within a guided wave portion of the doped optical fiber and preferably located near the center of the length of fiber. In a referred embodiment, the grating is a photo induced Bragg grating that is fabricated, for example, by the techniques disclosed in the aforementioned articles to Meltz, et al or Kashgap, et al, except that the grating is not formed perpendicular to a longitudinal axis of the fiber 16. Instead, the grating is oriented at nonperpendicular angle with respect to a longitudinal axis of the fiber. This enables light at the interaction wavelength of the grating to exit the fiber.

The angle at which the grating must be oriented is easily calculated. It is well know that the critical angle which separates guided and unguided modes is where $\theta = \sqrt{2\Delta}$ where $\Delta$ is the difference in the index of refraction between the core and the cladding of the optical fiber waveguide. For a typical erbium fiber, $\Delta = 0.017$. Thus, $\theta = \sqrt{2*0.017} = 0.184$ radians = $10.6°$. For such a fiber, an angle of about $13°$ would be selected to ensure that all of the light reflected by the Bragg grating will go into an unguided mode and exit the fiber.

In order to flatten the gain slope of the optical amplifier, the interaction wavelength of the Bragg grating is selected to correspond to a wavelength at or near the wavelength at which the spontaneous emission produced by the fiber peaks.

FIG. 4 illustrates the gain spectra of an erbium-doped fiber amplifier. As can be seen, a gain peak 40 of about 32 dB is obtained at 1532 nm, with a much reduced gain of about 24 dB at 1550 nm. As a result, the amplifier 3 dB bandwidth is only about 4.5 nm. By providing an in-fiber Bragg grating having an interaction wavelength of about 1532 nm, the gain peak 40 is substantially eliminated by diverting the spontaneous emission corresponding thereto out of the fiber. Thus, the flattened gain spectrum indicated by dashed line 42 results, providing a 3 dB bandwidth of over 30 nm.

An amplifier in accordance with the present invention is particularly useful in a wave division multiplexed, multi-channel signal distribution system using cascaded amplifiers along the distribution path. Such a system is illustrated in FIG. 2. A headend 20 provides a multiplex of communication signals to an optical fiber distribution path 20. A plurality of amplifiers 24, 26, 28 are cascaded within the distribution path. Each of the amplifiers is a doped optical fiber amplifier with an in-fiber grating as illustrated in FIG. 1. The flattened gain curve allows cascaded amplifiers to operate without premature saturation in the region of the gain peak. This, coupled with the favorable gain bandwidth of the amplifiers, provides efficient signal distribution.

The in-fiber Bragg grating of the present invention can also be used to flatten the gain of a laser. Such an embodiment is illustrated in FIG. 3, wherein a pump laser 30 is used to pump a rare earth-doped fiber 36 residing between reflectors 32, 34 that form a laser cavity. An in-fiber Bragg gating 38, equivalent to the grating 18 illustrated in FIG. 1, diverts excess spontaneous emission from fiber 36 to flatten the gain slope of the laser. This is particularly advantageous in a tunable laser, in order to effect continuous and uniform tuning.

It should now be appreciated that the present invention provides techniques for flattening the gain curve in doped optical fiber components. More specifically, an in-fiber Bragg grating, which can be formed using photorefractive techniques, is oriented at a nonperpendicular angle with respect to a longitudinal axis of the doped fiber to divert peak spontaneous emission therefrom.

Although the invention has been described in connection with several preferred embodiment, those skilled in the art will appreciate that numerous adaptations and modifications may be made thereto without departing from the spirit and scope of the invention, as set forth in the claims.

What is claimed is

1. A fiber optical amplifier having a flattened gain slope comprising:
   a length of doped optical fiber for amplifying an optical signal therein when pumped with a source of pump energy, said fiber producing spontaneous emission when pumped; and
   a Bragg grating within a guided wave portion of said doped optical fiber, said grating oriented at a nonperpendicular angle $\theta$ with respect to a longitudinal axis of said fiber and having an interaction wavelength selected to flatten the gain slope of the amplifier by diverting excess spontaneous emission from said fiber; where:

$$\theta = \sqrt{2\Delta}$$

and $\Delta$ is the difference in index of refraction between a core and a cladding of said fiber.

2. An amplifier in accordance with claim 1 wherein said interaction wavelength is selected to correspond to a wavelength at or near the wavelength at which the spontaneous emission produced by said fiber peaks.

3. An amplifier in accordance with claim 2 wherein said grating is a photoinduced Bragg grating within said guided wave portion.

4. An amplifier in accordance with claim 1 wherein said fiber is an erbium-doped fiber and said interaction wavelength is about 1532 nm.

5. An optical fiber communication system comprising:
   an optical transmission path for carrying a plurality of optical signals to be distributed from a headend; and
   a plurality of optical amplifiers cascaded in series along said path for amplifying said optical signals, said optical amplifiers each comprising:
      a length of doped optical fiber for amplifying an optical signal therein when pumped with a source of pump energy; and
      a Bragg grating within a guided wave portion of said doped optical fiber, said grating oriented at a nonperpendicular angle with respect to a longitudinal axis of said fiber and having an interaction wavelength selected to flatten the gain slope of the amplifier by diverting excess spontaneous emission form said fiber.

6. A communication system in accordance with claim 5 wherein said optical amplifiers are erbium fiber amplifiers and the interaction wavelength of said gratings is about 1532 nm.

7. An optical fiber laser having a flattened gain slope for outputting an optical carrier comprising:
   a length of rare earth doped optical fiber for providing gain when pumped with a source of pump energy, said fiber producing spontaneous emission when pumped;
   a laser cavity incorporating said doped optical fiber and having an output for said optical carrier; and
   a Bragg grating within a guided wave portion of said doped optical fiber, said grating oriented at a nonperpendicular angle $\theta$ with respect to a longitudinal axis of said fiber and having an interaction wavelength selected to flatten the gain slope of the laser by diverting excess spontaneous emission from said fiber; where $$\theta = \sqrt{2\Delta}$$

and $\Delta$ is the difference in index of refraction between a core and a cladding of said fiber.

8. A laser in accordance with claim 7 wherein said interaction wavelength is selected to correspond to a wavelength at or near the wavelength at which the spontaneous emission produced by said fiber peaks.

9. A laser in accordance with claim 8 wherein said grating is a photoinduced Bragg grating within said guided wave portion.

10. A laser in accordance with claim 7 wherein said fiber is an erbium-doped fiber and said interaction wavelength is about 1532 nm.

11. A method for flattening the gain slope of an optical fiber amplifier comprising the steps of:
    providing a length of doped optical fiber for amplifying an optical signal therein when pumped with a source of pump energy, said fiber producing spontaneous emission when pumped; and
    diverting excess spontaneous emission from said fiber using a Bragg grating situated within a guided wave portion of the fiber;
    wherein said grating has an interaction wavelength that is selected to correspond to a wavelength at or near the wavelength at which the spontaneous emission produced by said fiber peaks; and
    said grating is oriented at a nonperpendicular angle with respect to a longitudinal axis of said fiber to provide an exit path from the fiber for said excess spontaneous emission.

12. A method in accordance with claim 11 wherein said nonperpendicular angle is an angle $\theta$ where:

$$\theta = \sqrt{2\Delta}$$

and $\Delta$ is the difference in index of refraction between a core and a cladding of said fiber.

13. A method in accordance with claim 11 wherein said fiber is an erbium-doped fiber and said interaction wavelength is about 1532 nm.

* * * * *